K. L. VAN AUKEN.
TRUCK FRAME.
APPLICATION FILED FEB. 16, 1918.
1,410,969.
Patented Mar. 28, 1922.
3 SHEETS—SHEET 2.
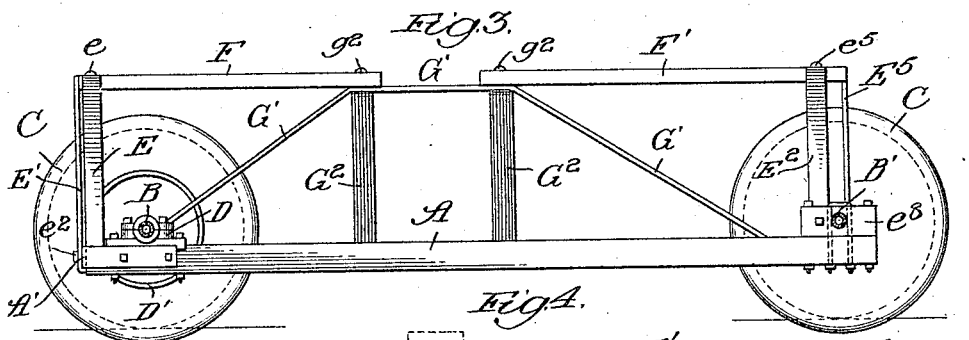
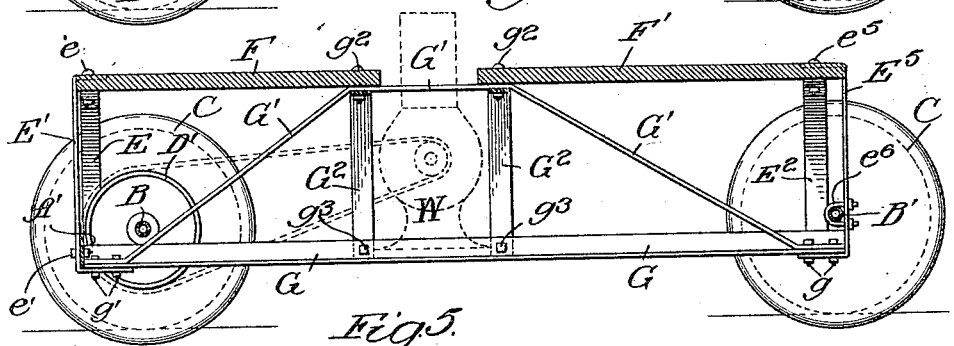
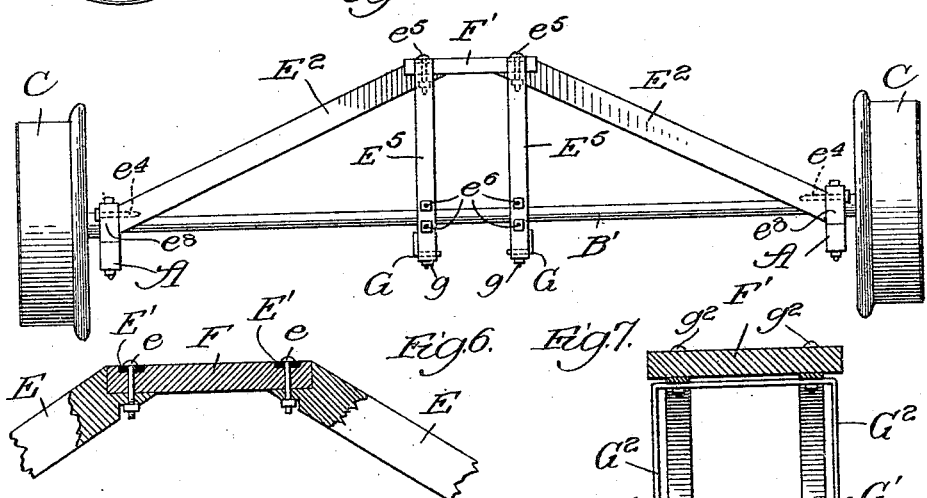
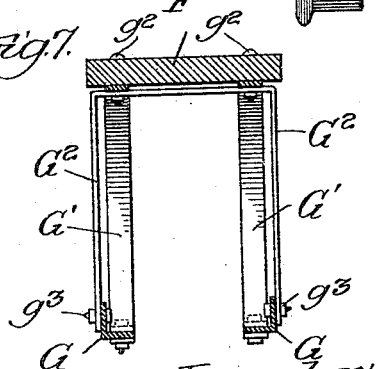

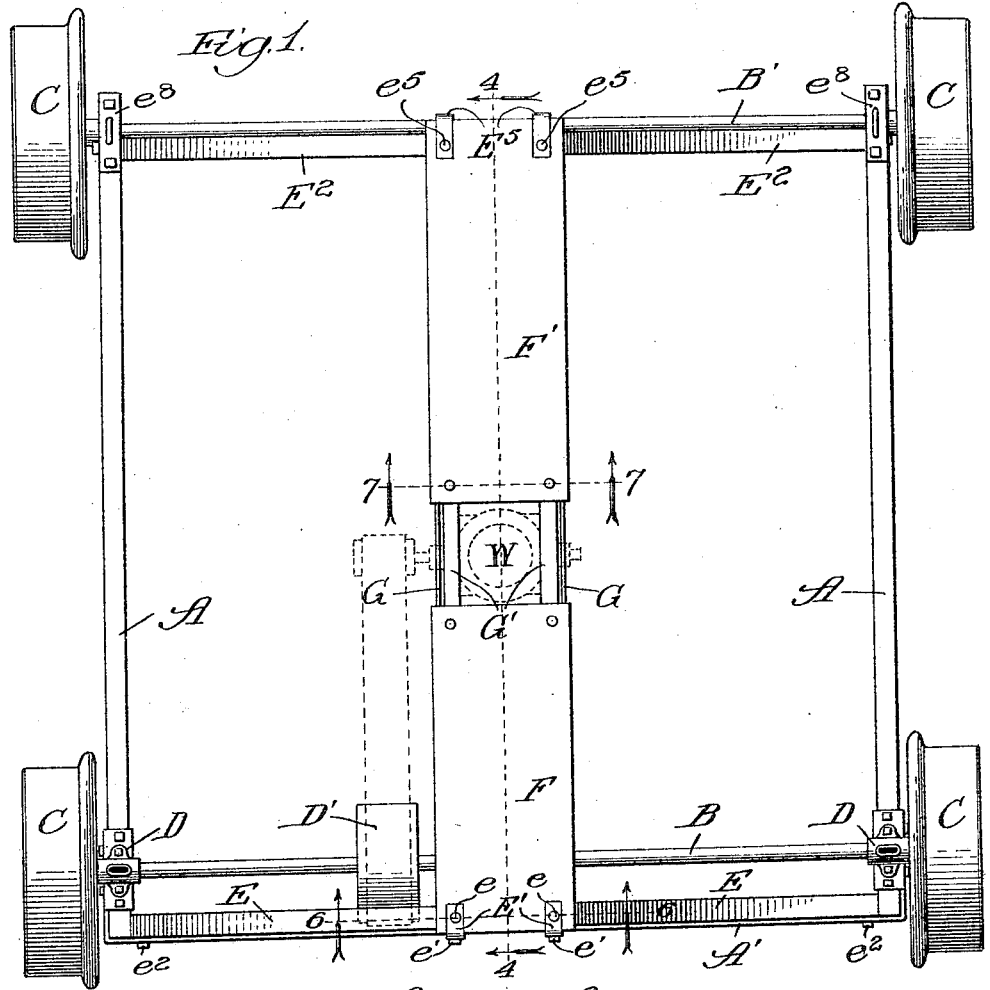
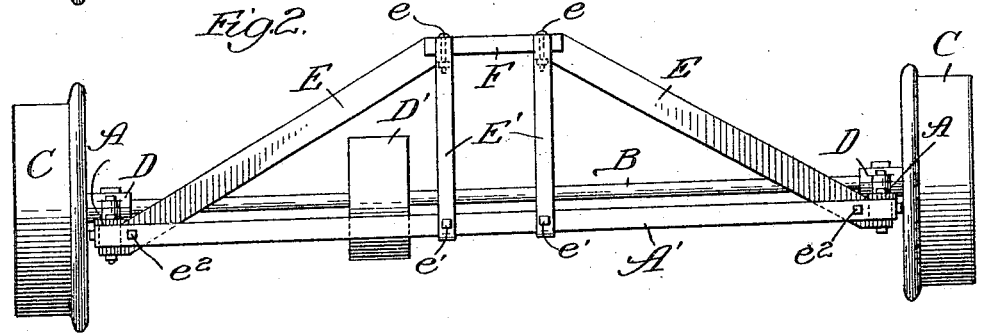

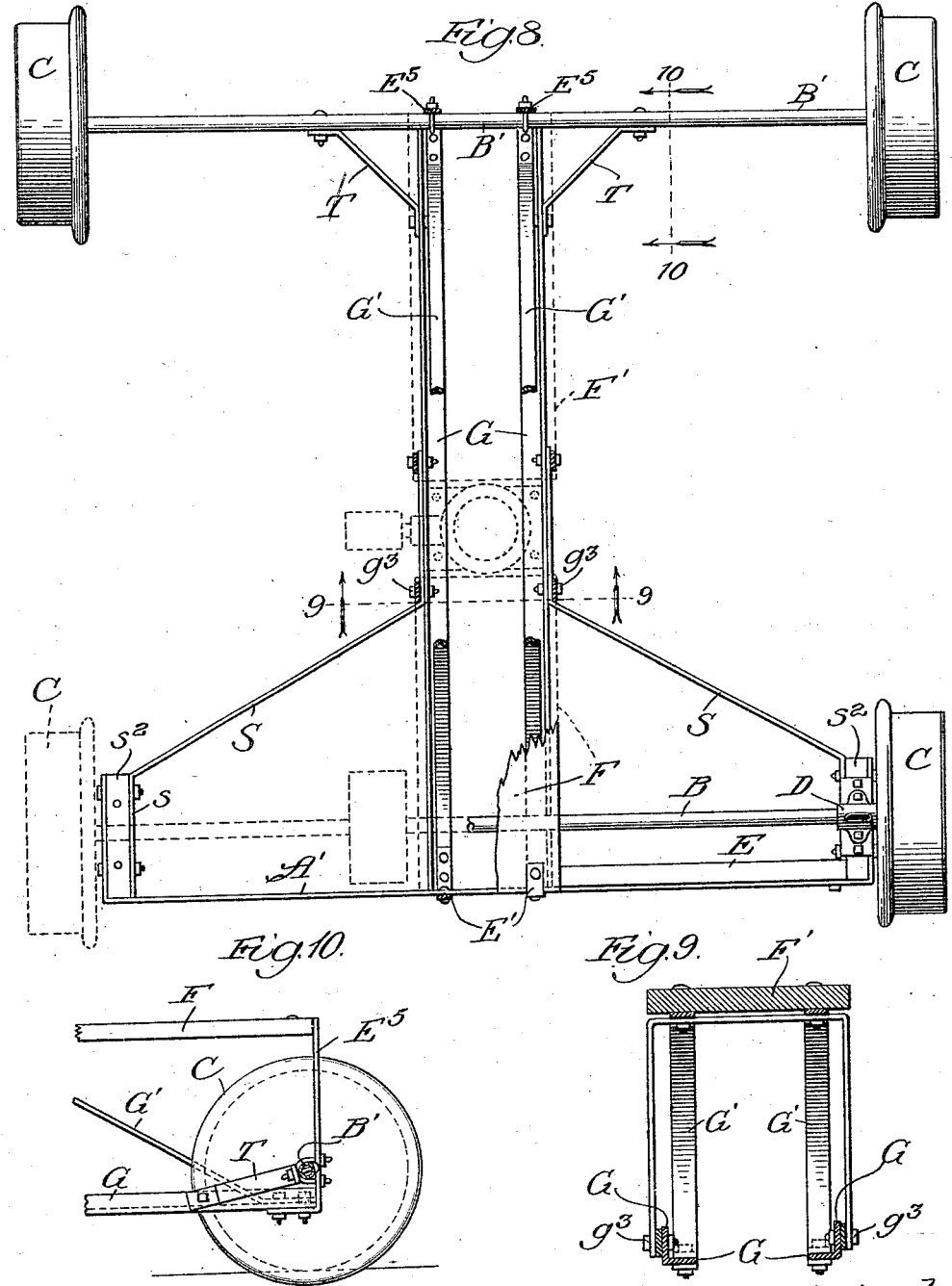

UNITED STATES PATENT OFFICE.

KENNETH L. VAN AUKEN, OF CHICAGO, ILLINOIS.

TRUCK FRAME.

1,410,969.  Specification of Letters Patent.  Patented Mar. 28, 1922.

Application filed February 16, 1918. Serial No. 217,680.

*To all whom it may concern:*

Be it known that I, KENNETH L. VAN AUKEN, a citizen of the United States, residing at Chicago, in the county of Cook and State of Illinois, have invented certain new and useful Improvements in Truck Frames, of which I do declare the following to be a full, clear, and exact description, reference being had to the accompanying drawings, forming a part of this specification.

The present invention has relation more particularly to the improvement of truck frames for railway motor cars, such for example, as are used by section gangs, and the object of the invention is to provide an extremely cheap, light and effective construction of truck frame. To this end the invention consists of the features of novelty hereinafter described, illustrated in the accompanying drawings and particularly pointed out in the claims at the end of this specification.

Figure 1 is a plan view of a truck frame embodying my invention. Figure 2 is a front end view. Figure 3 is a view in side elevation. Figure 4 is a view in vertical longitudinal section on line 4—4 of Fig. 1. Figure 5 is a rear end view. Figure 6 is an enlarged detail view in vertical section on line 6—6 of Fig. 1. Figure 7 is an enlarged detail view in vertical section on line 7—7 of Fig. 1. Fig. 8 is a plan view, parts being broken away, showing a modified form of the invention. Fig. 9 is a view in vertical cross section on line 9—9 of Fig. 8. Fig. 10 is a view in cross section on line 10—10 of Fig. 8.

A designates the side bars of the truck frame and across these side bars at the opposite ends thereof extend the wheel axle B and B' at the ends of which are the wheels C. The axles B and B' may be tubular axles, the ends having fitted and secured therein short solid sections that pass through the hubs of the wheels C. The front axle B is mounted in suitable journal boxes D secured to the side bars A adjacent their front ends and as this front axle B is the driving axle, the wheels C at the ends thereof will be rigidly secured thereto, the axle being provided with a pulley D', sprocket wheel, or the like, to receive motion from the motor W mounted upon the truck. At their front ends, the side bars A are connected together by an iron bar or strap A', the ends of which are bent and pass around the sides of the side bars A and are suitably bolted thereto. Between the front ends of the side bars A extend the upwardly and inwardly inclined truss members E, the upper ends of these members being preferably mortised, as shown in Fig. 2, and being suitably connected, as by bolts $e$, to the front section F of the seat plank. From the front end of the seat plank F and from the upper ends of the truss members E extend downwardly the metal bars or straps E'. The upper ends of these bars E' are preferably bent over the front end of the seat plank F (see Figs. 1 and 4) and are perforated to receive the bolts $e$, while the lower ends of the bars E' E' are bolted, as at $e'$, to the lower bar or member A' of the truss. The outer lower ends of the truss members E abut against the end portions of the side bars A and are suitably bolted, as at $e^2$, to the lower bar or member A' of the truss.

At the rear end of the truck frame, truss bars $E^2$ extend upwardly and inwardly from blocks $e^3$ on the ends of the side bars A, the lower ends of the truss members $E^2$ being suitably secured, as at $e^4$, to the said blocks, while the upper ends of the truss members $E^2$ are conveniently connected, as by bolts $e^5$, to the end of the rear section F' of the seat plank F. Across the rear ends of the side bars A extends the rear axle B' which forms the lower cord or member of the rear truss. I am able to employ the rear axle as the lower member of the rear truss, because inasmuch as the wheels C upon the rear axle are revolubly mounted thereon, the rear axle may be securely bolted to the side bars A of the truck, suitable wooden blocks being mounted on the side bars to receive the end portions of the axle B'. From the rear end of the seat plank section F' extend downwardly the vertical bars or rods $E^5$. The upper ends of these bars $E^5$ are bent and overlap the end of the seat plank section F' (see Fig. 1) and are connected thereto by the bolts $e^5$, while the lower portions of the bars $E^5$ are connected, as by U-bolts $e^6$, to the rear axle B'. The extreme lower ends of the vertical bars $E^5$ are bent inwardly and forwardly (see Fig. 4) and are connected, as by bolts $g$, to the rear ends of the bars G that form the lower members of two trusses that extend from end to end of the truck frame adjacent its longitudinal center. The front ends of the bars G are similarly connected by bolts $g'$ to the inwardly bent lower ends of the bars E, as clearly shown in Figs. 2 and 4 of the drawings. Each of the bars G is preferably an angle bar the bottom flanges of which extend inwardly and on these flanges may rest the base of the motor W. To the front and rear ends of the bars G are connected, by the bolts $g, g'$, the ends of the bars G' that form the diagonally bracing members of the trusses that extend longitudinally of the truck. The central portion of each of the bars G' is formed with a horizontal part, as shown, and these horizontal parts of the bars G' extend over the upper portions of the bars $G^2$ and are connected thereto, as by bolts $g^2$ (see Figs. 4 and 7). These bars $G^2$ are bent downwardly and have their lower ends bolted, as at $g^3$, to the upstanding portions of the longitudinal bars G. The inner ends of the front and rear sections F, F' of the seat plank rest upon and are bolted to the horizontal upper portions of the bars G'. In the preferred embodiment of the invention shown, the seat plank forms an upper part of the longitudinal truss of the structure. It will be seen also that this upper part or member at its end or ends forms part of the transverse truss or trusses of the structure, thereby giving great rigidity thereto.

In the modified form of the invention illustrated in Figs. 8 and 10, trusses will be provided as in the form of the invention hereinbefore described. The truss at the front end of the truck frame will comprise upper members E (one only being shown in Fig. 9) and a lower member A', as in the construction hereinbefore described, suitable vertical bars or struts E' extending between the upper and lower members. To the inwardly and rearwardly turned ends of the lower member A' of the front truss are connected the forward ends $s$ of the brace bars S, the rear ends of these bars extending inwardly and being connected, as by the bolts $g^3$, to the upstanding portions of the lower members G of the longitudinal trusses. Preferably, suitable spacing blocks $s^2$ are interposed between the inwardly turned ends of the truss member A', to afford a better support for the journal boxes D through which pass the ends of the front axle B.

In the modified form of the invention shown in Figs. 8 to 10, the rear truss is omitted, the rear end of the seat plank section F' being shown as supported by the bars $E^5$ that have their upper ends bolted to the plank section F', while their lower ends are bolted, as in the construction hereinbefore described, to the rear ends of the longitudinal truss members G. Preferably, brace bars T extend between and are bolted to the rear axle B' and the sides of the longitudinal truss members G, as clearly shown in Figs. 8 and 10 of the drawings. The upper longitudinal truss members G' will be the same in construction as illustrated in Figs. 3 and 4 and will be similarly bolted to the lower members G of the longitudinal trusses.

Other modifications of the invention may be made without departing from the spirit of the invention and features of the invention may be employed without its adoption as an entirety.

Having thus described my invention, what I claim as new and desire to secure by Letters Patent is—

1. A truck of the character described, comprising a frame having axles and carrying wheels at its front and rear ends, a vertically disposed, longitudinal truss extending between the ends of said frame, and a seat plank or bar forming part of said longitudinal truss.

2. A truck of the character described, comprising a frame having axles and carrying wheels at its front and rear ends, a vertically disposed, transverse truss at one end of said frame and a vertically disposed, longitudinal truss extending between the ends of said frame, an upper member of said longitudinal truss forming part of said transverse truss.

3. A truck of the character described, comprising a frame having axles and carrying wheels at the front and rear ends, a vertically disposed transverse truss at one end of said frame, and a vertically disposed, longitudinal truss extending between the ends of said frame, the upper member of said longitudinal truss being connected at its end to the top of said transverse truss.

4. A truck of the character described, comprising a frame having axles and carrying wheels at its front and rear ends, a vertically disposed, longitudinal truss extending between the ends of said frame, said truss comprising vertical end bars, longitudinal bottom bars, diagonally disposed bracing bars and a top portion comprising a seat plank or bar arranged longitudinally between said vertical end bars.

5. A truck of the character described, comprising a frame having axles and carrying wheels at its front and rear ends and having at its front end a cross bar and upper truss members extending diagonally upwardly and inwardly from the ends of said cross bar, a longitudinal truss extending between the ends of said frame, and a seat plank extending above said longitudinal truss.

6. A truck of the character described, having trusses at its ends, a central longitudinal truss, and a connection extending between the top of said central truss and the end trusses.

7. A truck of the character described, comprising a plurality of longitudinal trusses extending between its ends, and a seat bar connected to the top of said trusses.

8. A truck of the character described, comprising a plurality of longitudinal trusses, the bottom members of which have laterally extending parts to support a motor.

9. A truck of the character described, comprising end trusses and a longitudinal truss extending between said end trusses, and a seat plank mounted upon the tops of said several trusses.

10. A truck of the character described having at one end a truss comprising a lower truss member and upper truss members extending upwardly and inwardly from the ends of said lower truss member, and having at its opposite end a forwardly extending support for one end of a seat bar, and a longitudinal truss extending between said ends of said truck and comprising lower and upper truss members, a longitudinally extending seat plank or bar, diagonally arranged bracing bars and vertically disposed bars extending between the upper and lower members of said longitudinal truss.

KENNETH L. VAN AUKEN.